United States Patent

Warwick

[11] Patent Number: 4,470,485
[45] Date of Patent: Sep. 11, 1984

[54] DISC BRAKE ASSEMBLY

[75] Inventor: Edward H. Warwick, Englewood, Ohio

[73] Assignee: General Motors Corporation, Detroit, Mich.

[21] Appl. No.: 342,053

[22] Filed: Jan. 25, 1982

[51] Int. Cl.³ .................. F16D 55/02; F16D 65/78
[52] U.S. Cl. ...................... 188/71.6; 188/264 A; 192/113 A
[58] Field of Search ............... 188/71.6, 73.1, 73.2, 188/218 XL, 264 R, 264 A, 264 AA; 192/113 A, 107 R, 70.12, 113 R, 113 B

[56] References Cited

U.S. PATENT DOCUMENTS

| 1,536,667 | 5/1925 | Goeser | 188/264 R |
|---|---|---|---|
| 1,935,713 | 11/1933 | Herzinger et al. | 188/264 R |
| 2,133,597 | 10/1938 | Tjaarda | 188/264 R |
| 2,765,881 | 10/1956 | Pierce | 188/218 XL |
| 3,002,595 | 10/1961 | Weir | 192/113 B |
| 3,161,260 | 12/1964 | Benini | 188/264 R |
| 3,184,023 | 5/1965 | Hovde | 192/113 R |
| 3,295,640 | 1/1967 | Beuchle | 192/113 R |
| 3,623,577 | 11/1971 | Scharlack | 188/71.6 |
| 3,809,192 | 5/1974 | Stehle | 188/218 XL |
| 3,917,032 | 11/1975 | Hoffman, Jr. et al. | 188/73.44 |

FOREIGN PATENT DOCUMENTS

| 1176694 | 8/1964 | Fed. Rep. of Germany | 188/218 XL |
| 191820 | 1/1923 | United Kingdom | 172/70.12 |

Primary Examiner—Bruce H. Stoner, Jr.
Assistant Examiner—Robert J. Oberleitner
Attorney, Agent, or Firm—D. D. McGraw

[57] ABSTRACT

Several arrangements include the feature of disc constructions directing air flow between the linings and the disc braking surfaces to float the linings off the surfaces of the disc to eliminate or substantially reduce brake drag and provide cooling.

4 Claims, 6 Drawing Figures

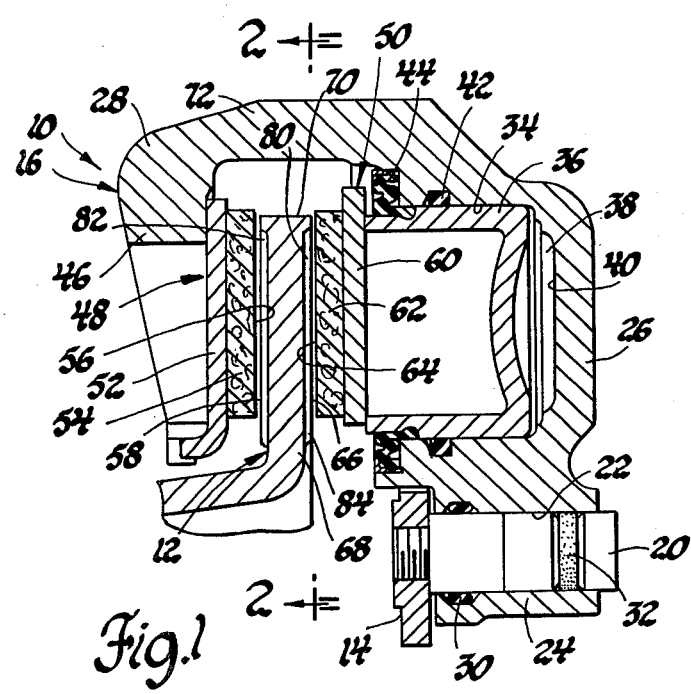

DISC BRAKE ASSEMBLY

The invention relates to a disc brake assembly having air flowing between the brake shoe linings and the brake surfaces of the disc upon brake release. The air flow is generated by rotation of the disc. It flows through portions of the disc at all times that the disc is rotating, providing disc cooling. It is a feature of the invention to direct air flow through openings in the braking surface of the disc upon brake release so that the air flow assists in moving the brake linings away from the discs and then floats the linings off of but immediately adjacent to the disc braking surfaces when the brakes are inactivated to produce and maintain a drag-free condition. Several structural arrangements embodying the invention are disclosed and claimed.

IN THE DRAWINGS

FIG. 1 is a cross-section view, with parts broken away, of a disc brake assembly embodying the invention.

FIG. 2 is a fragmentary elevation view taken in the direction of arrows 2—2 of FIG. 1 and showing a portion of the disc of that Figure.

FIG. 3 is a cross-section view of a disc brake assembly with parts broken away and illustrating another embodiment of the invention.

FIG. 4 is a fragmentary section view illustrating a portion of the disc of FIG. 3 and taken in the direction of arrows 4—4 of that Figure.

FIG. 5 is a cross-section view of a disc brake assembly with parts broken away and showing another embodiment of the invention.

FIG. 6 is a fragmentary section view of the disc of FIG. 5 taken in the direction of arrows 6—6 of that Figure.

The disc brake assembly 10 of FIG. 1 includes a disc 12, a fixed support member 14 and a caliper assembly 16. The disc is mounted so as to rotate about its axis with a vehicle wheel, as is well known in the art. The fixed support member 14 is secured to a suitable non-rotating portion of the vehicle such as the steering knuckle of a front-wheel suspension assembly. The caliper assembly is mounted on the fixed support member so as to be slidable in a direction which is parallel to the disc axis of rotation. The caliper assembly is illustrated as being mounted on the fixed support member 14 by a mounting pin or bolt 20. The particular mounting arrangement may be like that illustrated in U.S. Pat. No. 3,917,032 issued Nov. 14, 1975. Other disc brake arrangements may also be used in practicing the invention such as that illustrated in U.S Pat. No. 3,628,639, issued Dec. 21, 1971; or U.S. Pat. No. 3,648,807, issued Mar. 14, 1972 for example.

The mounting pin 20 is illustrated as extending through an aperture 22 formed in a boss 24 which is a part of caliper leg 26 of caliper housing 28. Suitable bushings 30 and 32 are provided to engage pin 20 and the wall of aperture 22 so that the caliper assembly 16 is slidable on pin 20. Leg 26 has a cylinder 34 formed therein in which piston 36 is reciprocally received. A pressure chamber 38 is defined between closed end 40 of cylinder 34 and the head of piston 36. A piston seal 42 is located in a housing groove and engages the outer peripheral wall of piston 36. The seal and its groove may be constructed and arranged to assist in piston retraction and adjustment, as is well known in the art. A boot 44 is mounted on caliper housing 28 and piston 36 and provides additional protection for the piston and cylinder.

The other leg 46 of caliper housing 28 supports a brake pad assembly 48 on the outboard side of disc 12. The inboard brake pad assembly 50 is supported on the caliper housing and piston 36 in a suitable manner also well known in the art. Brake pad assembly 48 includes a shoe 52 having a brake lining 54 secured thereto so that the lining face 56 is positioned in engagable relation with the outboard friction braking surface 58 of disc 12. Brake pad assembly 50 includes a shoe 60 to which lining 62 is secured so that the lining face 64 of lining 62 is engageable with the inboard friction braking surface 66 of disc 12. The disc inner periphery 68 is positioned radially inward of linings 54 and 62. The disc outer periphery 70 is positioned near the radially outer edge surfaces of linings 54 and 62. The caliper legs 26 and 46 are joined by a caliper housing bridge section 72 which extends over disc outer periphery 70 and in radially spaced relation thereto. The caliper assembly 16 covers only an arcuate portion of the disc 12. Thus when the disc is rotating and the brakes are actuated, most of the disc is moving through cooling air at any instant, as is well known in the art and shown in more detail in the patents noted above. To the extent that the assembly 10 has been so far described, the assemblies of FIGS. 3 and 5 are substantially identical and the same reference numerals are applied to those Figures. The features which distinguish the different embodiments and described below relate to the particular constructions of the disc.

The particular disc construction illustrated in FIGS. 1 and 2 has a series of air passages 80 formed in the disc friction braking surface 66 and a similar series of air passages 82 formed in friction braking surface 58. Air passages 80 will be further described in detail, it being understood that the air passages 82 are similarly constructed and arranged. Air passages 80 are circumferentially spaced in disc 12 and have inlets 84 located at or near the disc inner periphery 68. Air passage outlets 86 are positioned radially inward of the disc outer periphery 70 so that they are within the swept area of lining face 64. The particular air passages 80 are illustrated as channels which decrease in cross section area from inlets 84 to outlets 86.

When disc 12 is rotating, cooling air is pumped from inlets 84 radially outward through passages 80 to outlets 86. This flow is particularly enhanced while the air passages are in juxtaposition to lining face 64. With the brake assembly in the released position the air flowing through passages 80 and 82 increases in velocity and escapes in the small clearance space provided between the friction braking surfaces 66 and 58 and their associated lining faces 64 and 56. The air flow tends to cool the disc and linings and also tends to float the linings just out of engagement with the disc friction braking surfaces. The Venturi effect of the air flow between the disc and the linings tends to maintain a small but definite spacing between the disc and the linings while resisting a tendency of the linings to move very far away from the disc. The latter effect occurs because of the reduced air pressure created by the Venturi effect.

When the disc brake assembly 10 is actuated, the lining faces close the open channel sides of air passages 80 and 82 as passages are swept between brake linings. The passages not located between the brake linings continue to have a cooling effect on the disc 12. As the brakes are released, the air pressure built up in the outlet ends of the air passages by centrifugal force generates force acting on the brake linings by deviated flow. This force assists in urging the brake linings away from the disc friction braking surfaces. The air immediately flows through outlets 86 and between the lining faces and disc friction braking surfaces. The above described Venturi effect becomes operative upon slight disengagement of the lining with the disc. The force generated due to deviated flow prevents or at least assists in preventing a dragging reengagement of the linings and disc. Brake drag is therefore reduced or eliminated while the brakes are inactive, improving fuel economy and lengthening brake lining life.

The modification shown in FIGS. 3 and 4 has air passages 180 formed in the disc between the friction braking surfaces 58 and 66 and extending radially outward. Some of the air passages 180 may have their outlets 178 extending through the disc outer periphery 70. Other air passages 182 are similar to air passages 180 but have closures 188 at the disc outer periphery 70. Passages 182 are provided with outlets 186 which extend through the disc friction braking surfaces 58 and 66 within the annular circumferentially extending areas swept by linings 54 and 62. Air passages 180 and 182 are effectively defined by vanes 176 as is commonly used in vented brake discs currently in production. The air passage inlets 184 are positioned in or near the disc inner periphery 68. If desired, a majority or even all of the air passages may be provided with closures 188 and outlets 186. In the particular disc illustrated, open passages 180 and closed passages 182 alternately spaced circumferentially within the disc. The air in the closed passages 182 operates in a manner similar to that described above, acting to float the linings off of but immediately adjacent to the disc friction braking surfaces as it flows through outlets 186 and between the lining faces and the disc friction braking surfaces.

The air passages 280 and 282 illustrated in FIGS. 5 and 6 are tubularly formed within the disc between the friction braking surfaces. The longer air passages 280 and their outlets 286 alternately open through braking surfaces 58 and 66. The shorter air passages 282 and their outlets 290 alternately open through friction braking surfaces 58 and 66 radially inward of outlets 286. Outlets 286 and 290 are located within the circumferential areas swept by the linings 54 and 62. The air passage inlets 284 are located in or near the disc inner periphery 68. This construction performs in a similar manner to the construction of the other embodiments described in detail above. In all arrangements, the forces generated due to the deviated flow at the friction braking surfaces and lining faces urge the linings to a drag-free relationship with the disc, and the pressure decrease caused by the velocity head as the air passes outward between the friction braking surfaces and the lining faces resists excessive drag-free movement of the linings.

The embodiments of the invention in which an exclusive property or privilege is claimed are defined as follows:

1. In a disc brake assembly having a rotatable disc to be braked and a friction braking pad arranged to engage a side of the disc in a friction braking relation when the brake assembly is actuated and to have running clearance relative to the disc when the brake assembly is not actuated, means for cooling the brake assembly and assisting in establishing and maintaining running clearance after brake assembly deactuation, said means comprising:

air passages enclosed within said disc having an inner peripheral inlet and an outlet opening only through a surface portion of the disc side engaged by the friction braking pad during brake assembly actuation, said outlet being continuously and completely closed by the brake pads throughout the areas of actual frictional engagement of the brake pads with said opposed friction braking surfaces during brake assembly actuation, rotation of the disc urging air movement through said passage means from said inlet to said outlet, the air being so moved as the brake assembly is deactuated to impinge on the friction braking pad while flowing out between the disc and the friction braking pad, thereby to urge the friction pad away from the disc to maintain desired running clearance, the air flowing through said passage means and between the disc and the friction pad also cooling the brake assembly.

2. A rotatable disc for a vehicle disc brake assembly having brake pads frictionally engaged with the disc during brake actuation and having running clearances relative to the disc during brake deactuation, said disc comprising:

an annular disc portion having inner and outer peripheral surfaces and opposed friction braking surfaces adapted to be frictionally engaged by the brake pads during brake actuation;

and air passages formed so as to be closed within said annular disc portion and having inlets at said inner peripheral surface, said air passages extending toward but terminating short of said outer peripheral surface, said air passages also having outlets only in said opposed friction braking surfaces, said outlet being continuously and completely closed by the brake pads throughout the areas of actual frictional engagement of the brake pads with said opposed friction braking surfaces during brake actuation;

said air passages acting during disc rotation to urge air movement therethrough from said inlets to said outlets, said outlets being so positioned in said opposed friction braking surfaces as to be selectively closed by the brake pads when the brake pads are engaging the disc in friction braking relation and to permit impingement of air from the air passages on the brake pads upon and after brake deactuation and the flow of the air from said outlets between said friction braking surfaces and said brake pads so that establishment and maintenance of the running clearances are enhanced.

3. A rotatable disc for a vehicle disc brake assembly having brake pads frictionally engaged with the disc during brake actuation and having running clearances relative to the disc during brake deactuation, said disc comprising:

an annular disc portion having inner and outer peripheral surfaces and opposed friction braking surfaces adapted to be frictionally engaged by the brake pads during brake actuation;

and air passages formed so as to be closed within said annular disc portion and having inlets at said inner peripheral surface, said air passages extending toward but terminating short of said outer peripheral surface, said air passages also having outlets only in said opposed friction braking surfaces, said outlet being continuously and completely closed by the brake pads throughout the areas of actual frictional engagement of the brake pads with said opposed friction braking surfaces during brake actuation;

said air passages acting during disc rotation to urge air movement therethrough from said inlets to said outlets, said outlets being so positioned in said opposed friction braking surfaces as to be selectively closed by the brake pads when the brake pads are engaging the disc in friction braking relation and to permit impingement of air from the air passages on the brake pads upon and after brake deactuation and the flow of the air from said outlets between said friction braking surfaces and said brake pads so that establishment and maintenance of the running clearances are enhanced;

said air passages being defined by generally radially extending ribs positioned between said friction braking surfaces.

4. A rotatable disc for a vehicle disc brake assembly having brake pads frictionally engaged with the disc during brake actuation and having running clearances relative to the disc during brake deactuation, said disc comprising:

an annular disc portion having inner and outer peripheral surfaces and opposed friction braking surfaces adapted to be frictionally engaged by the brake pads during brake actuation;

and air passages formed so as to be closed within said annular disc portion and having inlets at said inner peripheral surface, said air passages extending toward but terminating short of said outer peripheral surface, said air passages also having outlets only in said opposed friction braking surfaces, said outlet being continuously and completely closed by the brake pads throughout the areas of actual frictional engagement of the brake pads with said opposed friction braking surfaces during brake actuation;

said air passages acting during disc rotation to urge air movement therethrough from said inlets to said outlets, said outlets being so positioned in said opposed friction braking surfaces as to be selectively closed by the brake pads when the brake pads are engaging the disc in friction braking relation and to permit impingement of air from the air passages on the brake pads upon and after brake deactuation and the flow of the air from said outlets between said friction braking surfaces and said brake pads so that establishment and maintenance of the running clearances are enhanced;

said air passage outlets for said air passages being arranged in radially staggered relation so that some outlets are positioned closer to said outer peripheral surface than other outlets.

* * * * *

UNITED STATES PATENT AND TRADEMARK OFFICE
CERTIFICATE OF CORRECTION

PATENT NO. : 4,470,485
DATED : September 11, 1984
INVENTOR(S) : Edward H. Warwick It is certified that error appears in the above-identified patent and that said Letters Patent is hereby corrected as shown below:

Column 3, line 43, after "through" insert -- friction --.

Column 4, line 3, after "passages" insert -- means --.

Signed and Sealed this

Twenty-eighth Day of May 1985

[SEAL]

Attest:

DONALD J. QUIGG

Attesting Officer        Acting Commissioner of Patents and Trademarks